(12) United States Patent
Koncelik, Jr.

(10) Patent No.: US 6,738,694 B2
(45) Date of Patent: May 18, 2004

(54) REMOTELY CONTROLLING A SERVANT AIRCRAFT

(76) Inventor: Lawrence J. Koncelik, Jr., 10 Gingerbread La., East Hampton, NY (US) 11937

( * ) Notice: Subject to any disclaimer, the term of this patent is extended or adjusted under 35 U.S.C. 154(b) by 0 days.

(21) Appl. No.: 10/302,363

(22) Filed: Nov. 21, 2002

(65) Prior Publication Data

US 2003/0139858 A1 Jul. 24, 2003

Related U.S. Application Data

(63) Continuation-in-part of application No. 10/245,619, filed on Sep. 17, 2002.

(51) Int. Cl.$^7$ .......................... G06F 17/00; G01S 13/93
(52) U.S. Cl. ............................. 701/2; 701/9; 701/302; 340/945; 342/29
(58) Field of Search ............................. 701/2, 302, 4, 701/3, 9–11, 300, 301; 244/17.13, 181, 118.5; 340/945, 963; 342/29, 32, 36, 357.08

(56) References Cited

U.S. PATENT DOCUMENTS

| | | | | |
|---|---|---|---|---|
| 5,493,309 A | * | 2/1996 | Bjornholt | 342/455 |
| 6,133,867 A | * | 10/2000 | Eberwine et al. | 342/29 |
| 6,392,692 B1 | * | 5/2002 | Monroe | 348/143 |
| 6,456,941 B1 | * | 9/2002 | Gutierrez | 701/301 |
| 6,531,978 B2 | * | 3/2003 | Tran | 342/29 |
| 2003/0016159 A1 | * | 1/2003 | Stayton et al. | 342/30 |
| 2003/0055540 A1 | * | 3/2003 | Hansen | 701/3 |

* cited by examiner

*Primary Examiner*—Tan Q. Nguyen
(74) *Attorney, Agent, or Firm*—Walter J. Teneza

(57) ABSTRACT

A remote control signal, such as a signal from a GPS satellite, is received at a servant aircraft. If the remote control signal is valid, a processor on the servant aircraft prevents or inhibits anyone on the servant aircraft from controlling the flight or course of the servant aircraft. The remote control signal controls the flight and/or course of the servant aircraft. The remote control signal may come from an escort aircraft.

11 Claims, 7 Drawing Sheets

REMOTELY CONTROLLING A SERVANT AIRCRAFT

CROSS REFERENCE TO RELATED APPLICATION

This present application is a continuation in part of and claims the priority of U.S. patent application Ser. No. 10/245,619, filed on Sep. 17, 2002, inventor and applicant, Lawrence J. Koncelik Jr., titled "CONTROLLING AIRCRAFT FROM COLLISIONS WITH OFF LIMITS FACILITIES".

FIELD OF THE INVENTION

This invention relates to improved methods and apparatus concerning avoiding disasters as a result of aircraft crashing into off limits facilities.

BACKGROUND OF THE INVENTION

Typically in the prior art there are inadequate protections available to prevent an aircraft from crashing intentionally into an off limits facilities. While it is known to provide devices, which help protect aircraft from colliding with other aircraft, such as a device disclosed in U.S. Pat. No. 6,314,366, typically these devices merely provide assistance to pilots who exercise the ultimate control over the flight and course of the aircraft.

SUMMARY OF THE INVENTION

In one embodiment of the present invention a method is disclosed comprising the steps of receiving a remote control signal at a servant aircraft, determining if the remote control signal is valid, and inhibiting anyone on the servant aircraft from controlling the flight of the servant aircraft if the remote control signal is valid. The remote control signal may be a global positioning satellite signal. The remote control signal may come from an escort aircraft. The flight of the servant aircraft may be changed in response to the remote control signal. The step of inhibiting anyone on the servant aircraft from controlling the flight of the servant aircraft may include disabling a pilot input device which normally can be used to control the flight of the servant aircraft by someone on board the servant aircraft.

The present invention in one embodiment provides an apparatus comprising a receiver and a processor typically located on an aircraft. The receiver and the processor are connected by a communications link. The receiver receives a signal from an off limits facility and provides the signal to the processor. The processor determines from the signal whether an aircraft is within a distance of the off limits facility and changes a course of the aircraft if the aircraft is within the distance of the off limits facility. The off limits facility may be, for example, a building, a military installation, a nuclear power plant, or a landmark. The off limits facility may be a movable object such as an aircraft or a ship.

The apparatus may be further comprised of a pilot input device. The pilot input device allows a pilot on the aircraft to change the course of the aircraft when the aircraft is not within the distance of the off limits facility. The processor disables the pilot input device, so that the pilot on the aircraft cannot control the flight and/or the course of the aircraft when the aircraft is within the distance of the off limits facility. The pilot input device may include a device for manually controlling the flight and/or the course of the aircraft and a device for automatically controlling flight and/or the course of the aircraft by setting a course or a flight pattern for an automatic pilot to follow.

In a further embodiment of the present invention a receiver receives a signal from an airport and provides the signal to a processor. The processor determines from the signal whether an aircraft will be allowed to take off from the airport. The processor prevents the aircraft from taking off, if the signal from the airport indicates that the aircraft should be prevented from taking off. The apparatus may be further comprised of a transmitter. The transmitter may send a signal from the aircraft indicating that the aircraft has an operational device for altering the course of the aircraft when the aircraft is within a distance of an off limits facility.

In a further embodiment of the present invention an apparatus is provided comprising a global positioning satellite receiver located on an aircraft. The global positioning satellite receiver provides a signal to a processor, which indicates the position of the aircraft. The processor determines from the signal whether the aircraft is within a distance of an off limits facility. The processor changes the flight and/or course of the aircraft if the aircraft is within the distance of the off limits facility.

The present invention also includes a method comprising the steps of receiving a signal from an off limits facility; determining from the signal whether an aircraft is within a distance of the off limits facility; and changing the course and/or flight of the aircraft if the aircraft is within the distance of the off limits facility. A method is also provided comprising the steps of receiving a signal from an airport; determining from the signal whether an aircraft will be allowed to take off from the airport; and preventing the aircraft from taking off, if the signal from the airport indicates that the aircraft should be prevented from taking off. The present invention also includes a method comprising the steps of receiving a signal from a satellite; determining from the signal whether the aircraft is within a distance of an off limits facility; and changing the course and/or flight of the aircraft if the aircraft is within the distance of the off limits facility.

DETAILED DESCRIPTION OF THE DRAWINGS

Figure 1:
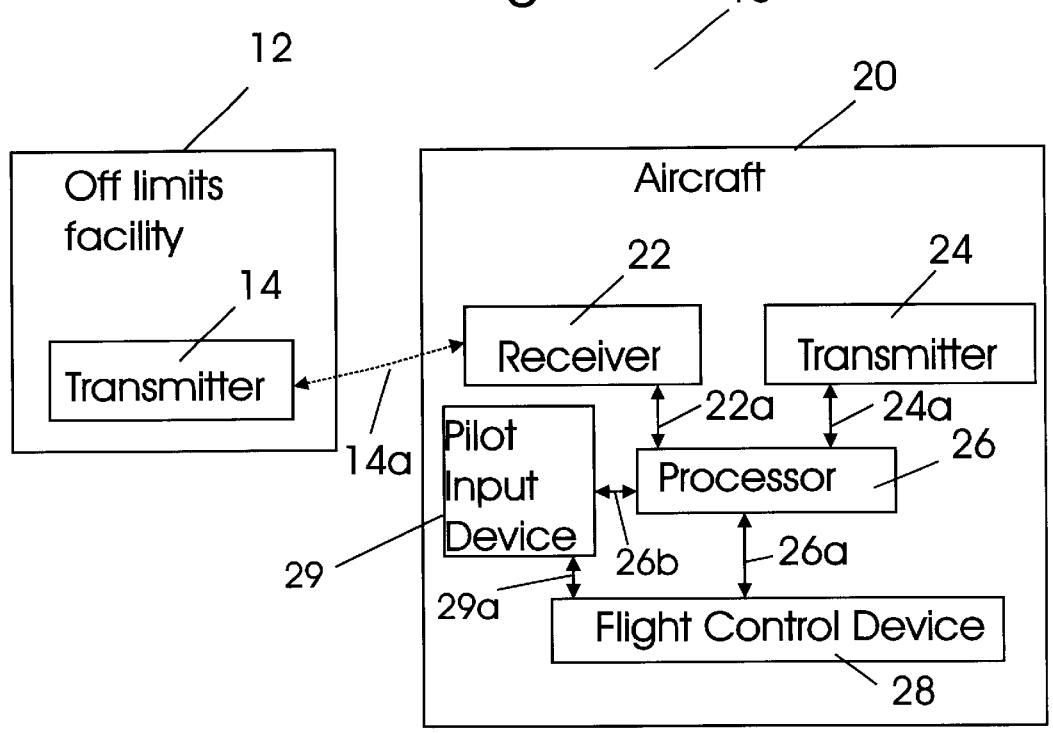
FIG. 1 shows a block diagram of an apparatus in accordance with a first embodiment of the present invention.
Figure 2:
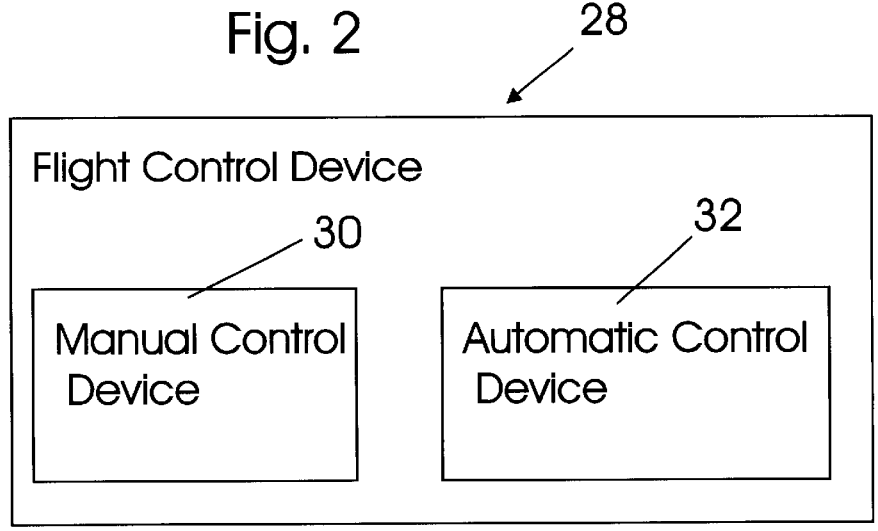
FIG. 2 shows a block diagram of a flight control device for use with the embodiment of FIG. 1.

FIG. 1 shows a block diagram of an apparatus 10 in accordance with a first embodiment of the present invention.

The apparatus 10 includes an off limits facility 12 and an aircraft 20. The off limits facility 12 has a transmitter 14 associated with the off limits facility 12 which is located on or in the immediate vicinity of the off limits facility 12. The off limits facility 12 may be, for example, a military installation, a landmark, or a nuclear power station. The off limits facility 12 may be a tall building, such as the Empire State building. The off limits facility 12 in certain embodiments may also be a movable object such as an aircraft or a ship.

The aircraft 20 has a receiver 22, a transmitter 24, a processor 26, a flight control device 28, and a pilot input device 29. The transmitter 14 associated with the off limits facility 12 and the transmitter 24 of the aircraft 20 may transmit any type of known signal such as electromagnetic, wireless, optical, or radio. The processor 26 may be a typical computer processor. The receiver 22 and the transmitter 24 are electrically connected to the processor 26 via busses 22a and 24a, respectively. The processor 26 is electrically connected to the flight control device 28 by bus 26a. The pilot input device 29 may be electrically connected to the flight control device 28 by bus 29a and to the processor by bus 26b. The pilot input device 29 may be comprised of any controls typically found on an airplane for allowing a pilot to control the flight of the aircraft 20, such as through manual control or by setting data or a course for an automatic pilot. The electrical connections provided by busses 22a, 24, 26a, 26b, and 29a may be or may be replaced by wireless connections, optical connections, software connections, electromagnetic connections and any other communication connections or links.

The flight control device 28 may be comprised of a manual control device 30, which is typically used for manually controlling the flight of aircraft and an automatic control device 32 or automatic pilot, which is also typically used for automatically controlling the flight of aircraft when activated by a pilot of the aircraft.

Figure 4:
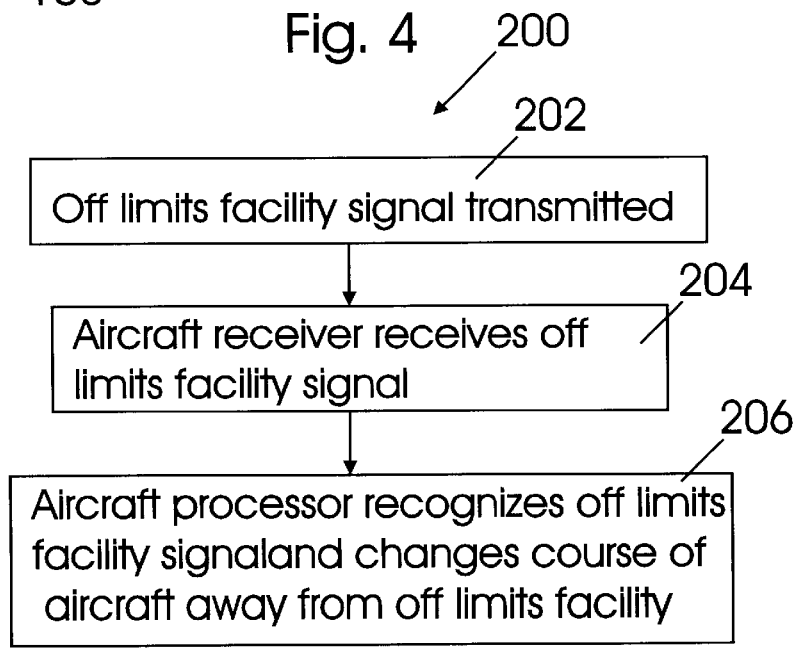
FIG. 4 shows a flow chart of a method for use with the apparatus of FIG. 1.

FIG. 4 shows a flow chart of a method 200 for use with the apparatus 10 of FIG. 1. The method 200 includes steps 202, 204, and 206. At step 202 a location, warning, or off limits facility signal is transmitted from the off limits facility 12 or from the general vicinity of the off limits facility 12. The off limits facility signal travels from the transmitter 14 to the receiver 22 via communications link or wireless link 14a. Wireless link 14a may merely be the airwaves.

At step 204 the receiver 22 of the aircraft 20 in FIG. 1 receives the off limits facility signal. In one embodiment if the off limits facility signal is strong enough, such as of sufficient amplitude, then the processor 26, at step 206, causes the aircraft 20 to change its course away from the off limits facility signal 12 by controlling flight control device 28. In one embodiment of the present invention, the manual control device 30 is overridden and the automatic control device 32 is controlled by the processor 26 so that the flight of the aircraft 20 is completely controlled by the processor 26 and set to a course which is away from the off limits facility 12. In this embodiment, the pilot input device 29 is disabled by the processor 26 preventing the pilot from changing the course set by the processor 26. In alternative embodiments the pilot may be able to input a code into the pilot input device 29 to re-establish control of the aircraft 20. After the course and/or flight of the aircraft 20 has been controlled so that the aircraft 20 is again a sufficient distance away from the off limits facility, control can be returned to a pilot on board the aircraft 20, i.e. the pilot on board will be again be able to control the flight and/or course of the aircraft 20 through the pilot input device 29.

In alternative embodiments, the processor 26 may determine if the off limits facility signal has a specific frequency or has some other particular characteristic. If the off limits facility signal has a particular characteristic the processor 26 will take control of the aircraft.

Figure 3:
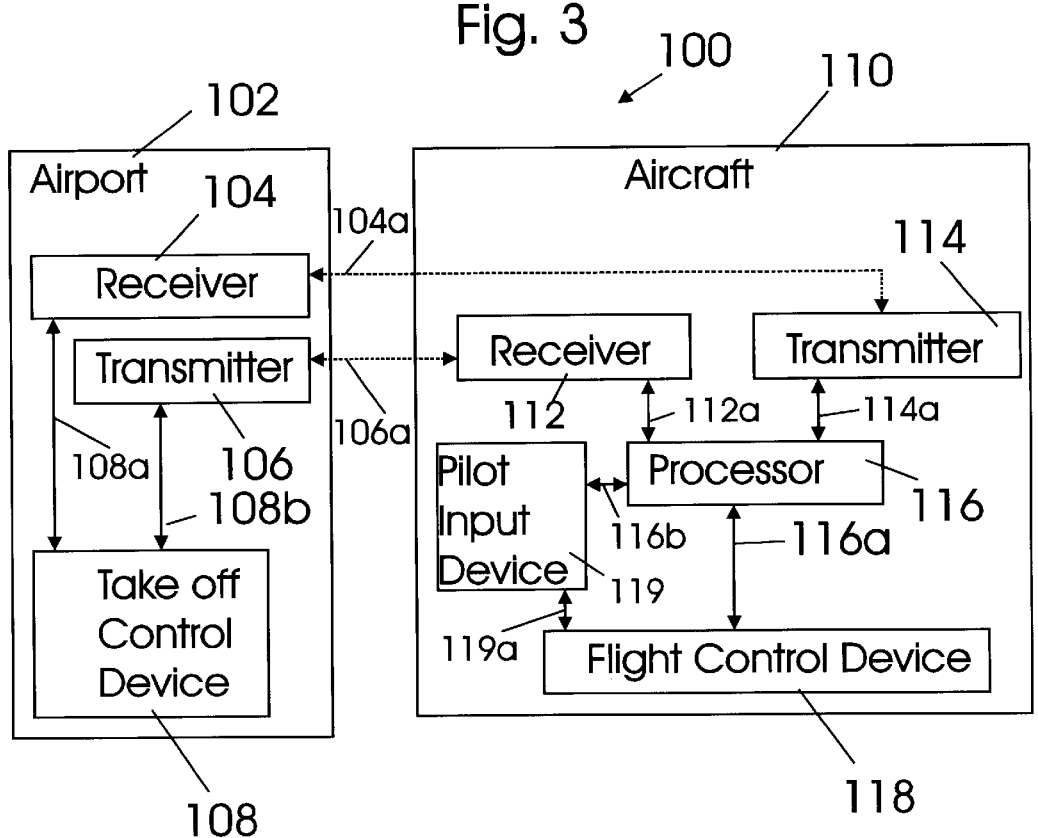
FIG. 3 shows a block diagram of an apparatus in accordance another embodiment of the present invention.

FIG. 3 shows a block diagram of an apparatus 100 in accordance another embodiment of the present invention. The apparatus is comprised of an airport 102 and/or its vicinity and an aircraft 110. The airport 102 has a receiver 104, a transmitter 106 and a take off control device 108 which may be located at the airport 102 or its vicinity. The receiver 104 and the transmitter 106 may be electrically connected to the take off control device 108 by busses 108a and 108b.

The aircraft 110 includes a receiver 112, a transmitter 114, a processor 116, a flight control device 118, and a pilot input device 119. The receiver 112, transmitter 114, pilot input device 119 and the flight control device 118 are electrically connected by busses 112a, 114a, 116b, and 116a, respectively, to the processor 116. The pilot input device 119 may be similar to pilot input device 29 in FIG. 1. The pilot input device 119 is also electrically connected to the flight control device 118 by bus 119a. As for FIG. 1, the busses may be any type any type of communication link or connection, such as a wireless, optical or electrical connection.

Figure 5:
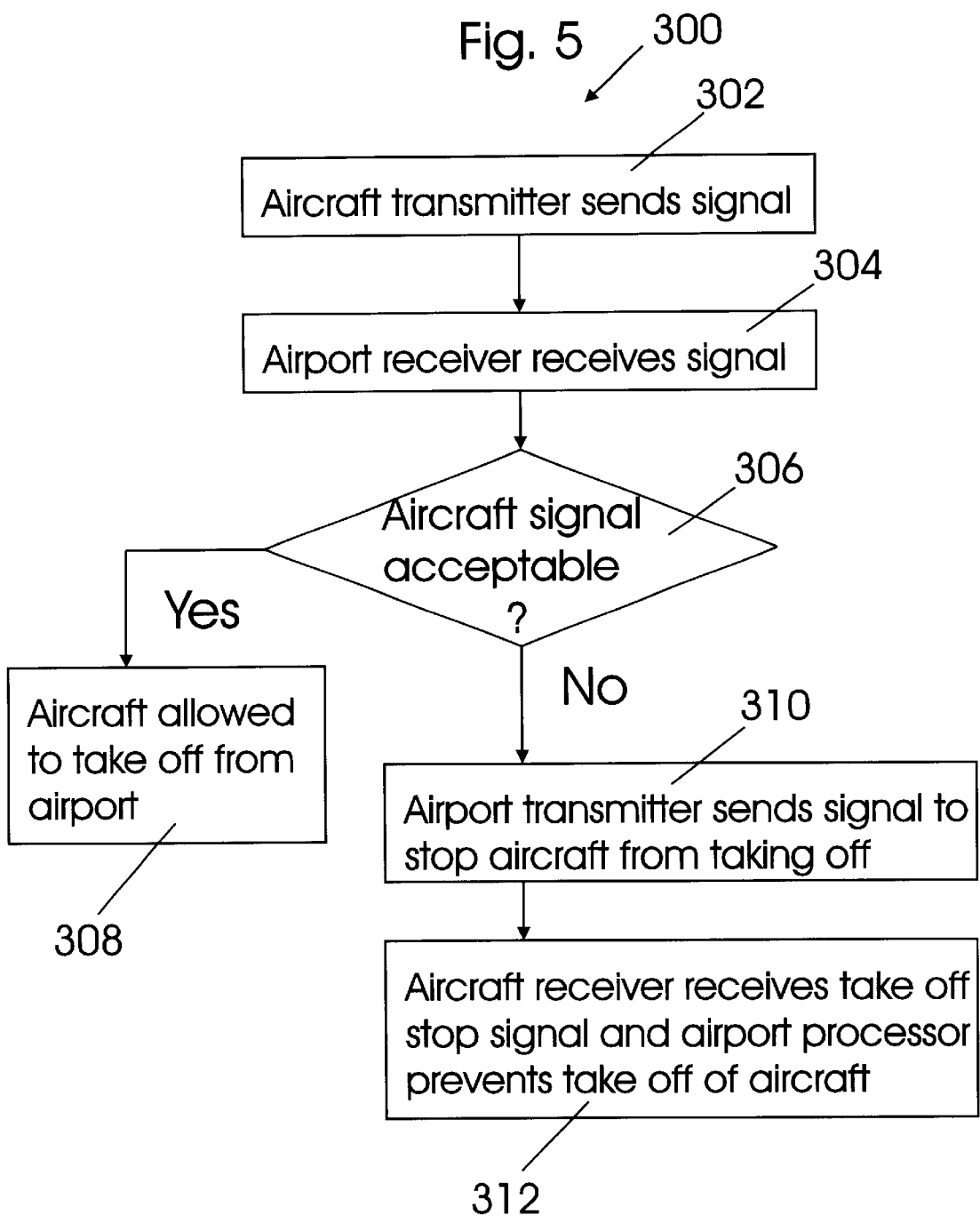
FIG. 5 shows a flow chart of a method for use with the apparatus of FIG. 3.

FIG. 5 shows a flow chart 300 of a method for use with the apparatus 100 of FIG. 3. FIG. 5 includes step 302, at which the transmitter 114 sends a first aircraft signal over communications link 104a (which may be the airwaves) to the receiver 104 of the airport 102. At step 304, the airport 102 receives the first aircraft signal. At step 306, the take off control device 108 determines whether the first aircraft signal is acceptable. The first aircraft signal will be acceptable if it indicates that the processor 116 of the aircraft 110 is in a ready condition so that it will be able to steer the aircraft 110 away from a restricted area or facility. If the first aircraft signal is acceptable, then the aircraft 110 is allowed to take off from the airport 102 at step 308.

If the first aircraft signal is not acceptable, then the airport transmitter 106 sends a stop signal via communications link 106a (which may be the airwaves) to the receiver 112 of the aircraft 110. The stop signal is interpreted by processor 116 at step 312 and the processor 116 prevents the take off of the aircraft 110 by controlling the flight control device 118 to prevent any flight and by disabling the pilot input device 119. The pilot input device 119 can be enabled after the aircraft 110 has sent an appropriate signal to the airport 102.

Figure 6:
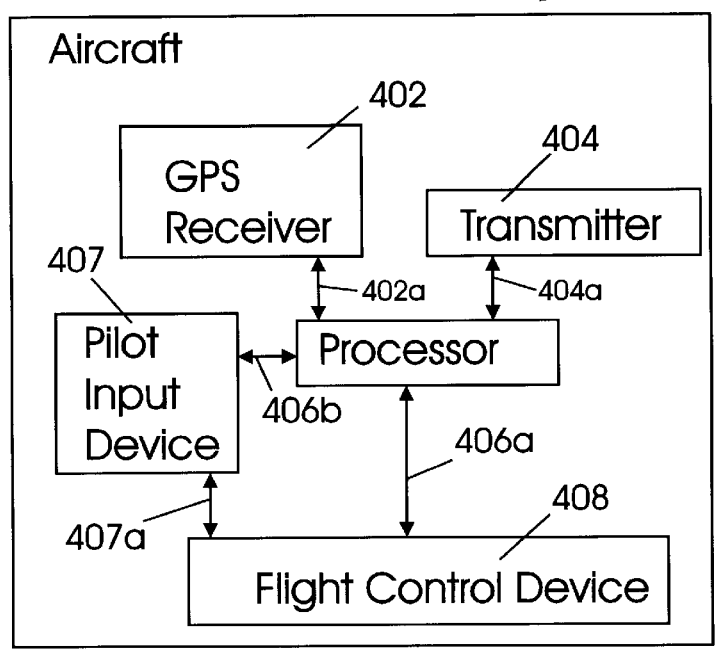
FIG. 6 shows a block diagram of an apparatus in accordance with another embodiment of the present invention.

FIG. 6 shows a block diagram of an aircraft 400 in accordance with another embodiment of the present invention. The aircraft 400 is comprised of a GPS (global positioning satellite) receiver 402, a transmitter 404, a processor 406, a pilot input device 407, and a flight control device 408. The GPS receiver 402, transmitter 404, processor 406, the pilot input device 407, and the flight control device 408 are electrically connected by busses 402a, 404a, 406b, and 406a to the processor 406. The pilot input device 407 is electrically connected to the flight control device 408 by the bus 407a. The busses of the present invention generally may be any type of communications link or connection.

Figure 7:
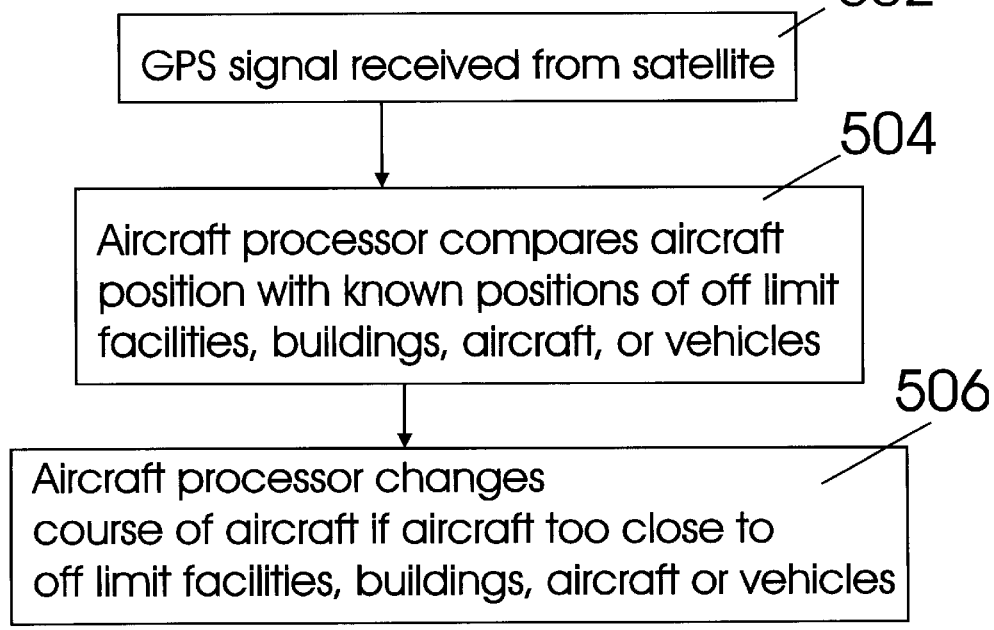
FIG. 7 shows a flow chart of a method for use with the apparatus of FIG. 6.

FIG. 7 shows a flow chart 500 of a method for use with the aircraft 400 of FIG. 6. At step 502 a GPS signal is received by the GPS receiver 402 from a satellite. The GPS signal typically provides data, which specifies the position of at least the aircraft 400. The GPS signal from the satellite may be provided in response to a signal sent from the aircraft 400 to the satellite via transmitter 404. The transmitter 404 may periodically request an updated GPS signal from the satellite to determine the aircraft's latest or updated position.

At step 504 the aircraft processor 406 receives the GPS signal from the GPS receiver 402 and the aircraft processor 406 compares the aircraft 400 current position with known positions of off limits facilities, buildings, aircraft or vehicles. Off limit facilities may include military installations, landmarks, nuclear power plants, and other off limits facilities. The off limit facilities may include a movable object such as an aircraft or a battleship, if the current position of the movable object is known.

At step 506 the aircraft processor 406 changes the course of the aircraft 400 if the aircraft 400 is too close to an off limits facility. In order to accomplish this, the aircraft processor 406 would send a signal to the flight control device 408 via bus 406a to cause the course of the aircraft 400 to change. In at least one embodiment of the present invention, the processor 406 would also disable the pilot input device 407 via bus 406b so that no person or pilot on board the aircraft 400 could control the aircraft 400 in any manner. The pilot input device 407 can be enabled after the aircraft 400 has gone beyond the appropriate distance from the off limits facility.

Any one of receivers 26, 112, or 402, and/or transmitters 24, 114, and 404 may be, or may be replaced by a combination transmitter/receiver or transceiver such as a TACAN transceiver (TACAN stands for Tactical Air Navigation System) which may provide both receiving and transmitting functions. TACAN type signals may be emitted by the off limits facility 12, for example, which may be in the form of azimuth signals which can be used by the processor 26 to steer the aircraft 20 via flight control device 28 (or automatic pilot which may be part of flight control device 28) to a preselected altitude and speed profile away from the off limits facility 12. U.S. Pat. No. 3,992,613 deals with the processing of such azimuth signals and is incorporated by reference herein. U.S. Pat. No. 6,314,366 is also incorporated by reference herein.

Figure 8:
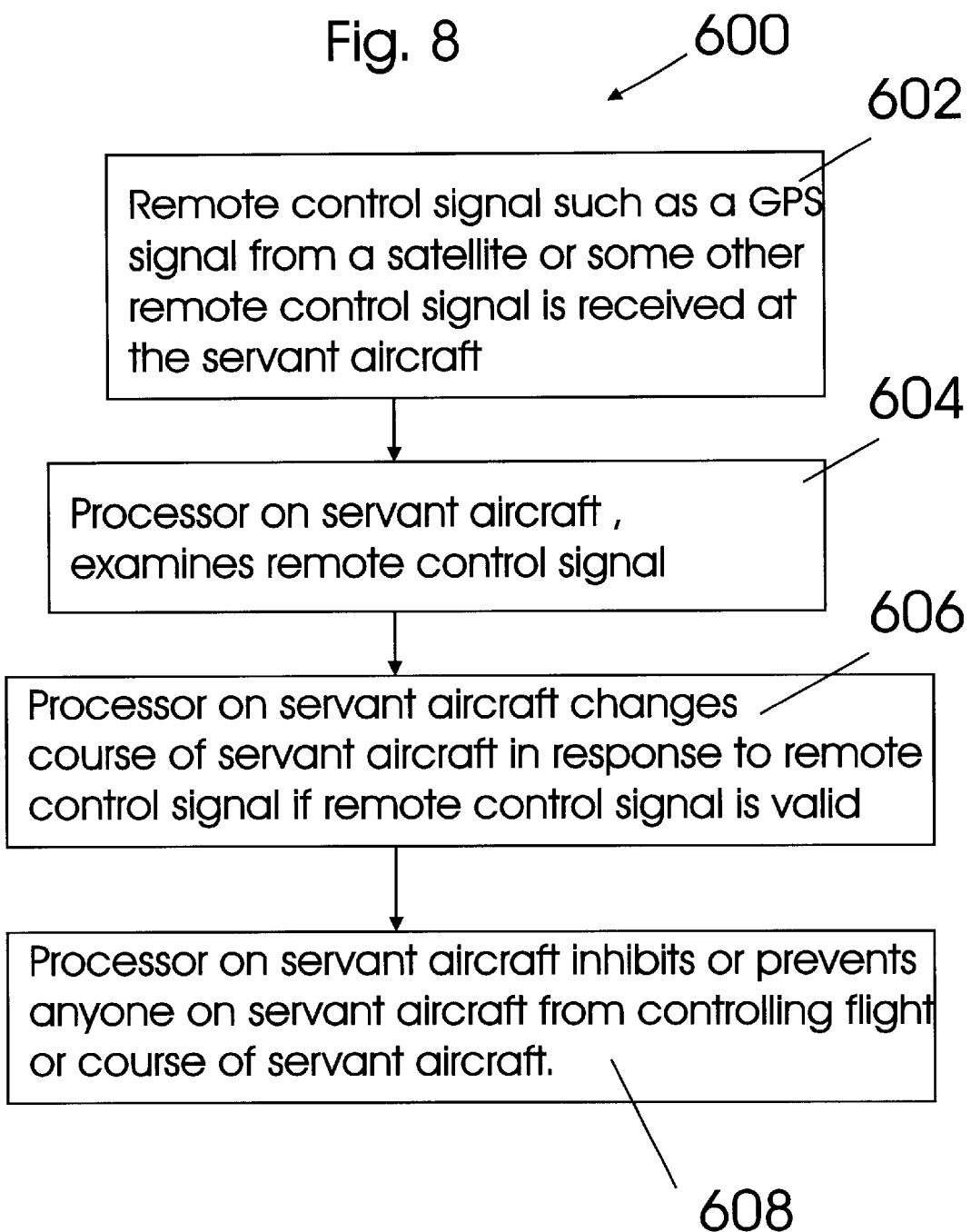
FIG. 8 shows a flow chart of a method in accordance with another embodiment of the present invention.

FIG. 8 shows a flow chart 600 of a method in accordance with another embodiment of the present invention. At step 602 of the method of FIG. 8, a remote control signal, such as a global positioning satellite signal (GPS) or some other remote control signal is received at a servant aircraft. The servant aircraft may be the same as or similar to the aircraft or apparatus 20 shown in FIG. 1. The remote control signal may be received by a receiver, such as receiver 22. At step 604 a processor on the servant aircraft, such as processor 26, may examine the remote control signal. At step 606 the processor, such as processor 26, may change the course or flight of the servant aircraft if the remote control signal is valid. At step 608 the processor, such as processor 26 on the servant aircraft may inhibit or prevent anyone on the servant aircraft from controlling the flight or course of the servant aircraft. This may be done by the processor 26 disabling the pilot input device 29 which inhibits or prevents anyone on board the servant aircraft from controlling the flight or course of the servant aircraft. In this manner the servant aircraft can be remotely controlled, regardless of where the servant aircraft is, especially if the servant aircraft appears to have been taken over by unauthorized or hostile forces, such as for example, if the servant aircraft has been hijacked.

Figure 9:
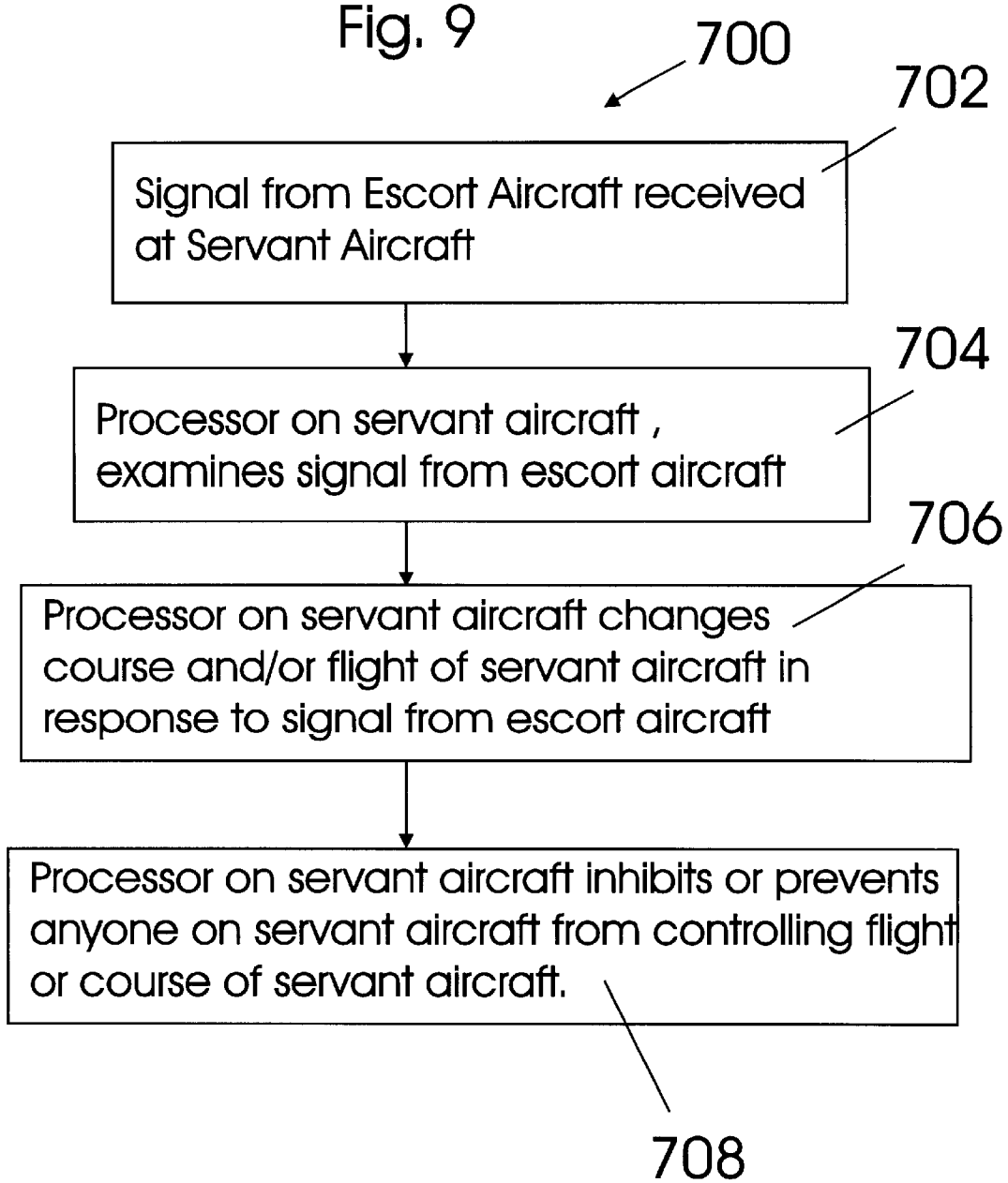
FIG. 9 shows a flow chart of a method in accordance with another embodiment of the present invention.
Figure 10:
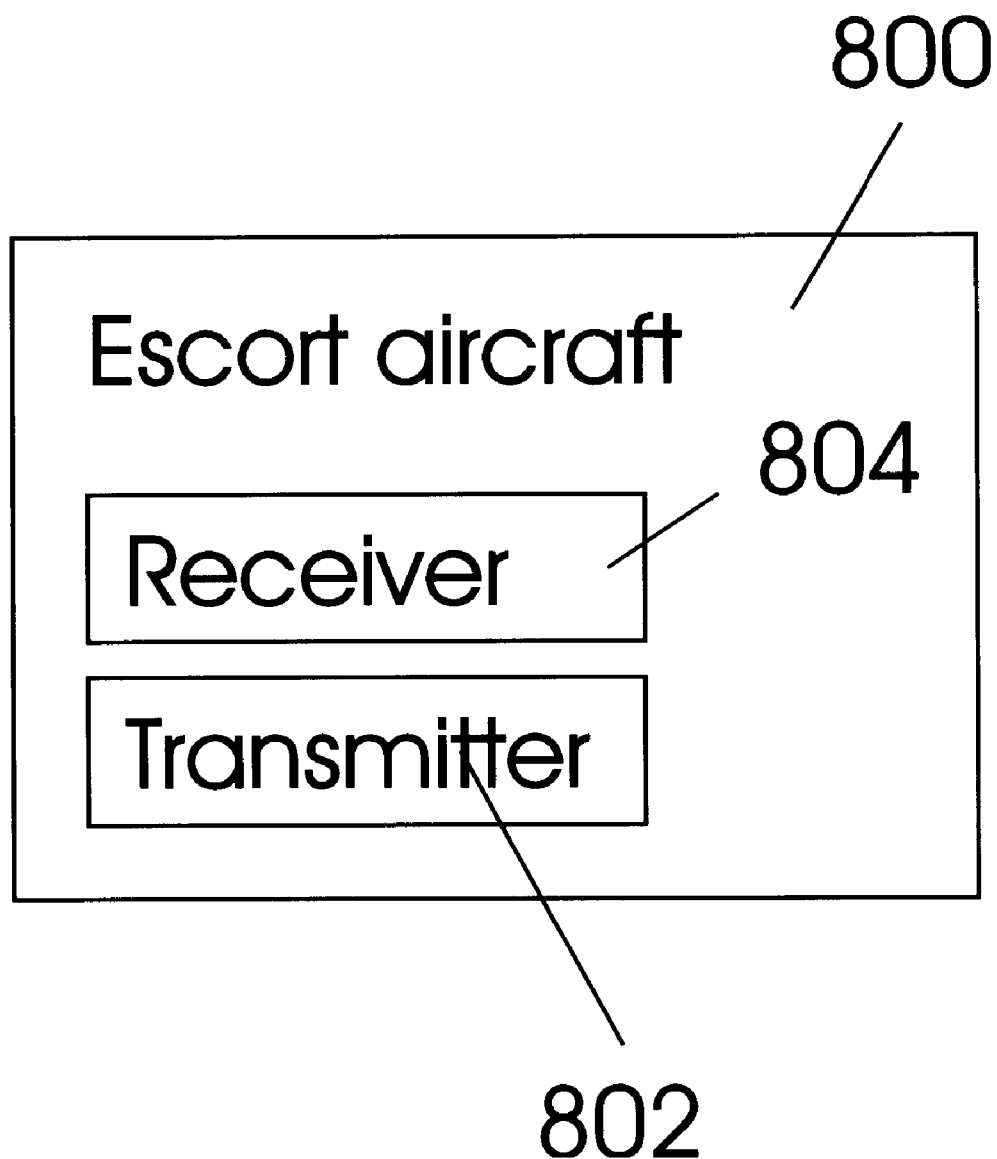
FIG. 10 shows a block diagram of an apparatus for use with the method of FIG. 9.

FIG. 9 shows a flow chart 700 of a method in accordance with another embodiment of the present invention. FIG. 10 shows a block diagram of an apparatus or escort aircraft 800 for use with the method of FIG. 9. At step 702 of the flow chart of FIG. 9, a signal is received at a servant aircraft from the escort aircraft, such as apparatus 800. The signal may be sent by a transmitter 802 and may be received by a servant aircraft, similar to or the same as aircraft or apparatus 20 at the receiver 22. A processor on the servant aircraft, such as processor 26 in FIG. 1, may be programmed to examine the signal from the escort aircraft 800 at step 704. The processor, such as processor 26, may change the course and/or flight of the servant aircraft in response to a valid signal from an escort aircraft at step 706. The processor, such as processor 26, on the servant aircraft may inhibit or prevent anyone on the servant aircraft from controlling the flight and/or course of the servant aircraft at step 708. This can be done, for example, by processor 26 sending a signal to disable the pilot input device 29 to prevent the control of flight or course of the servant aircraft by anyone on board the servant aircraft.

Although the invention has been described by reference to particular illustrative embodiments thereof, many changes and modifications of the invention may become apparent to those skilled in the art without departing from the spirit and scope of the invention. It is therefore intended to include within this patent all such changes and modifications as may reasonably and properly be included within the scope of the present invention's contribution to the art.

I claim:

1. A method comprising the steps of receiving a remote control signal at a servant aircraft;

determining if the remote control signal is valid; and regardless of where the servant aircraft is, inhibiting anyone on the servant aircraft from controlling the flight of the servant aircraft if the remote control signal is valid.

2. The method of claim 1 wherein the remote control signal is a global positioning satellite signal.

3. The method of claim 1 wherein the remote control signal comes from an escort aircraft.

4. The method of claim 1 further comprising changing the flight of the servant aircraft in response to the remote control signal.

5. The method of claim 1 wherein the step of inhibiting anyone on the servant aircraft from controlling the flight of the servant aircraft includes disabling a pilot input device which normally can be used to control the flight of the servant aircraft by someone on board the servant aircraft.

6. A servant aircraft comprised of a receiver;

a processor; and and a pilot input device which normally is used to control flight of the servant aircraft;

wherein receiver is adapted to receive a remote control signal; and wherein the processor is programmed to examine the remote control signal to determine if the remote control signal is valid, and regardless of where the servant aircraft is, if the remote control signal is valid, the processor is programmed to send a signal to disable the pilot input device to inhibit anyone on board the servant aircraft from controlling the flight of the servant aircraft.

7. The servant aircraft of claim 6 wherein the remote control signal is a global positioning satellite signal.

8. The servant aircraft of claim 6 wherein the remote control signal comes from an escort aircraft.

9. A method comprising sending a remote control signal from an escort aircraft;

controlling the flight of a servant aircraft by use of the remote control signal so that a collision between the servant aircraft and an off limits facility is avoided; and wherein the off limits facility is not the escort aircraft.

10. The method of claim 9 wherein the off limits facility is a further aircraft, which is not the escort aircraft.

11. The method of claim 9 wherein the off limits facility is a building.

\* \* \* \* \*